United States Patent
Urushibata et al.

(10) Patent No.: US 11,731,521 B2
(45) Date of Patent: Aug. 22, 2023

(54) FOREIGN MATTER DETECTION DEVICE AND POWER TRANSMISSION DEVICE

(71) Applicant: IHI Corporation, Tokyo (JP)

(72) Inventors: Eiichi Urushibata, Tokyo (JP); Kenji Nishimura, Tokyo (JP); Hideki Nagano, Tokyo (JP)

(73) Assignee: IHI Corporation, Tokyo (JP)

( * ) Notice: Subject to any disclaimer, the term of this patent is extended or adjusted under 35 U.S.C. 154(b) by 390 days.

(21) Appl. No.: 17/265,243

(22) PCT Filed: Aug. 19, 2019

(86) PCT No.: PCT/JP2019/032290
§ 371 (c)(1),
(2) Date: Feb. 2, 2021

(87) PCT Pub. No.: WO2020/059379
PCT Pub. Date: Mar. 26, 2020

(65) Prior Publication Data
US 2022/0396158 A1 Dec. 15, 2022

(30) Foreign Application Priority Data
Sep. 18, 2018 (JP) ................. 2018-173459

(51) Int. Cl.
*H02J 50/60* (2016.01)
*H02J 50/10* (2016.01)
*B60L 53/124* (2019.01)
*B60L 53/30* (2019.01)

(52) U.S. Cl.
CPC ............ *B60L 53/124* (2019.02); *H02J 50/10* (2016.02); *H02J 50/60* (2016.02); *B60L 53/30* (2019.02); *H02J 2310/48* (2020.01)

(58) Field of Classification Search
CPC ........ B60L 53/124; B60L 53/30; H02J 50/10; H02J 50/12; H02J 50/60
See application file for complete search history.

(56) References Cited

U.S. PATENT DOCUMENTS

| | | | |
|---|---|---|---|
| 2011/0074346 A1 | 3/2011 | Hall et al. | |
| 2012/0112691 A1* | 5/2012 | Kurs | H02J 50/60 320/108 |
| 2013/0314221 A1* | 11/2013 | Taylor | G06T 7/11 340/435 |
| 2014/0084859 A1 | 3/2014 | Hall et al. | |
| 2014/0203629 A1 | 7/2014 | Hoffman et al. | |

(Continued)

FOREIGN PATENT DOCUMENTS

| | | |
|---|---|---|
| JP | 06-002975 U | 1/1994 |
| JP | 08-304044 A | 11/1996 |

(Continued)

*Primary Examiner* — Levi Gannon
(74) *Attorney, Agent, or Firm* — Volpe Koenig

(57) ABSTRACT

A foreign object detection device detects, during wireless power transfer from a power transmission unit of a power transmission device to a power reception unit of a power reception device, a foreign object on the power transmission unit, and comprises: a temperature sensitive body that is disposed at the power transmission unit and changes a color with temperature; and a detection unit that detects the foreign object by detecting a change in the color.

6 Claims, 5 Drawing Sheets

(56) References Cited

U.S. PATENT DOCUMENTS

2015/0288214 A1 10/2015 Borngraber
2018/0316229 A1* 11/2018 Anwer .................... H02J 50/60

FOREIGN PATENT DOCUMENTS

| JP | 2007-025950 A | 2/2007 |
| JP | 2013-543719 A | 12/2013 |
| JP | 5691863 B2 | 4/2015 |
| JP | 2016-511393 A | 4/2016 |
| WO | 2017/112942 A1 | 6/2017 |

* cited by examiner

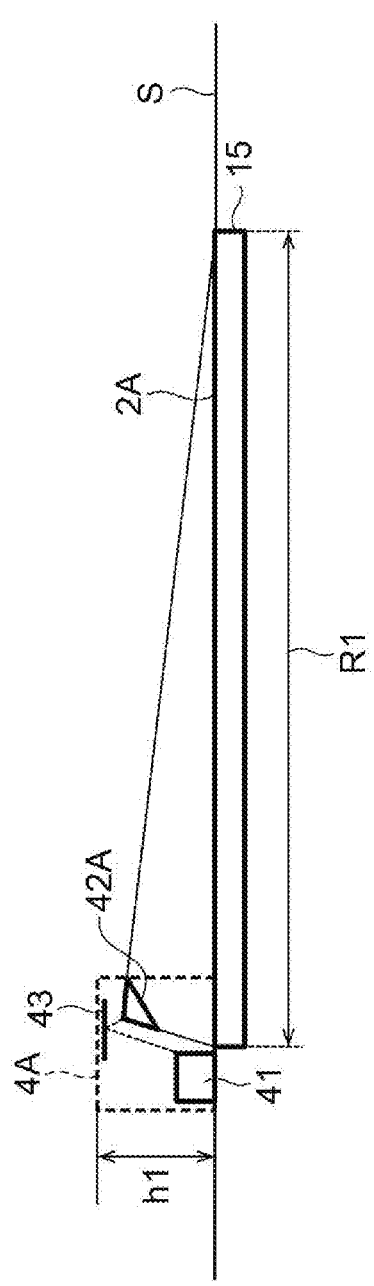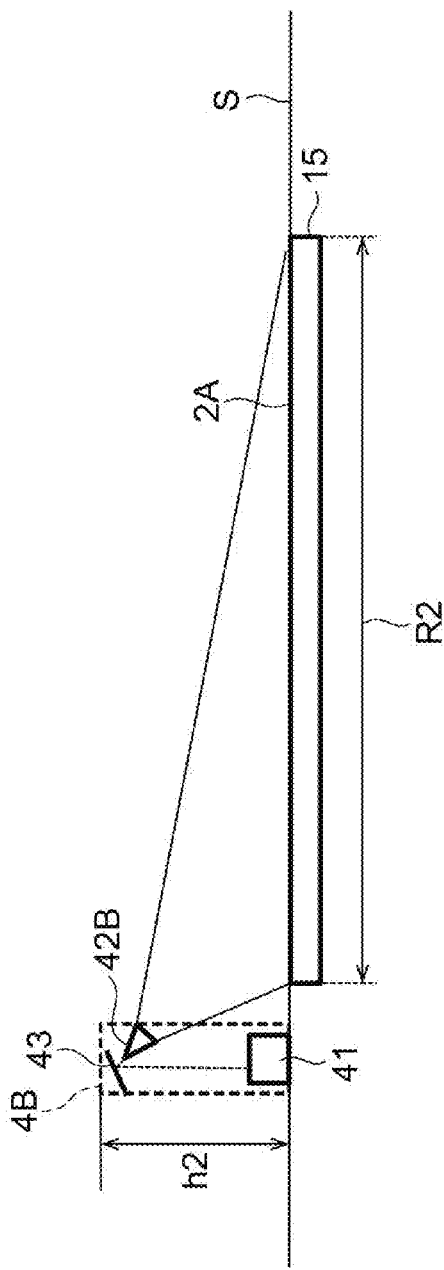
Fig. 2A
Fig. 2B

FOREIGN MATTER DETECTION DEVICE AND POWER TRANSMISSION DEVICE

TECHNICAL FIELD

The present disclosure relates to a foreign object detection device and a power transmission device.

BACKGROUND ART

Technology is known for wireless power transfer from a power transmission unit of a power transmission device installed in such as a parking lot to a power reception unit of a power reception device mounted on a motor vehicle. If a metal foreign object such as an empty can exists on the power transmission unit, the temperature around the foreign object may rise. In view of this fact, Patent Literature 1, for example, discloses a power transmission device comprising an infrared sensor and a thermographic camera. In the power transmission device in Patent Literature 1, power transmission is stopped when a foreign object on the power transmission unit is detected by either the infrared sensor or the thermographic camera.

CITATION LIST

Patent Literature

[Patent Literature 1] Japanese Patent No. 5691863

SUMMARY OF INVENTION

Technical Problem

By the way, in the aforementioned technology, it is necessary to install both an infrared sensor and a thermographic camera in order to detect foreign object on the power transmission unit. For this reason, the restriction is imposed that both an infrared sensor and a thermographic camera must be installed in the power transmission device. It has therefore been desired to detect a foreign object on the power transmission unit with a simpler configuration.

Therefore, the present disclosure describes a foreign object detection device and a power transmission device that can detect a foreign object on a power transmission unit with a simpler configuration.

Solution to Problem

A foreign object detection device according to one aspect of the present disclosure is a foreign object detection device detecting, during wireless power transfer from a power transmission unit of a power transmission device to a power reception unit of a power reception device, a foreign object on the power transmission unit, the foreign object detection device comprising: a temperature sensitive body disposed at the power transmission unit and changing a color with temperature; and a detection unit detecting the foreign object by detecting a change in the color.

Advantageous Effects of Invention

In the foreign object detection device and the power transmission device of the present disclosure, a foreign object on the power transmission unit can be detected with a simpler configuration.

BRIEF DESCRIPTION OF DRAWINGS

FIG. 2A is a diagram showing an example of a camera sensor unit with a wide-angle lens, and FIG. 2B is a diagram showing an example of a camera unit with a standard lens.

DESCRIPTION OF EMBODIMENTS

Figure 1:
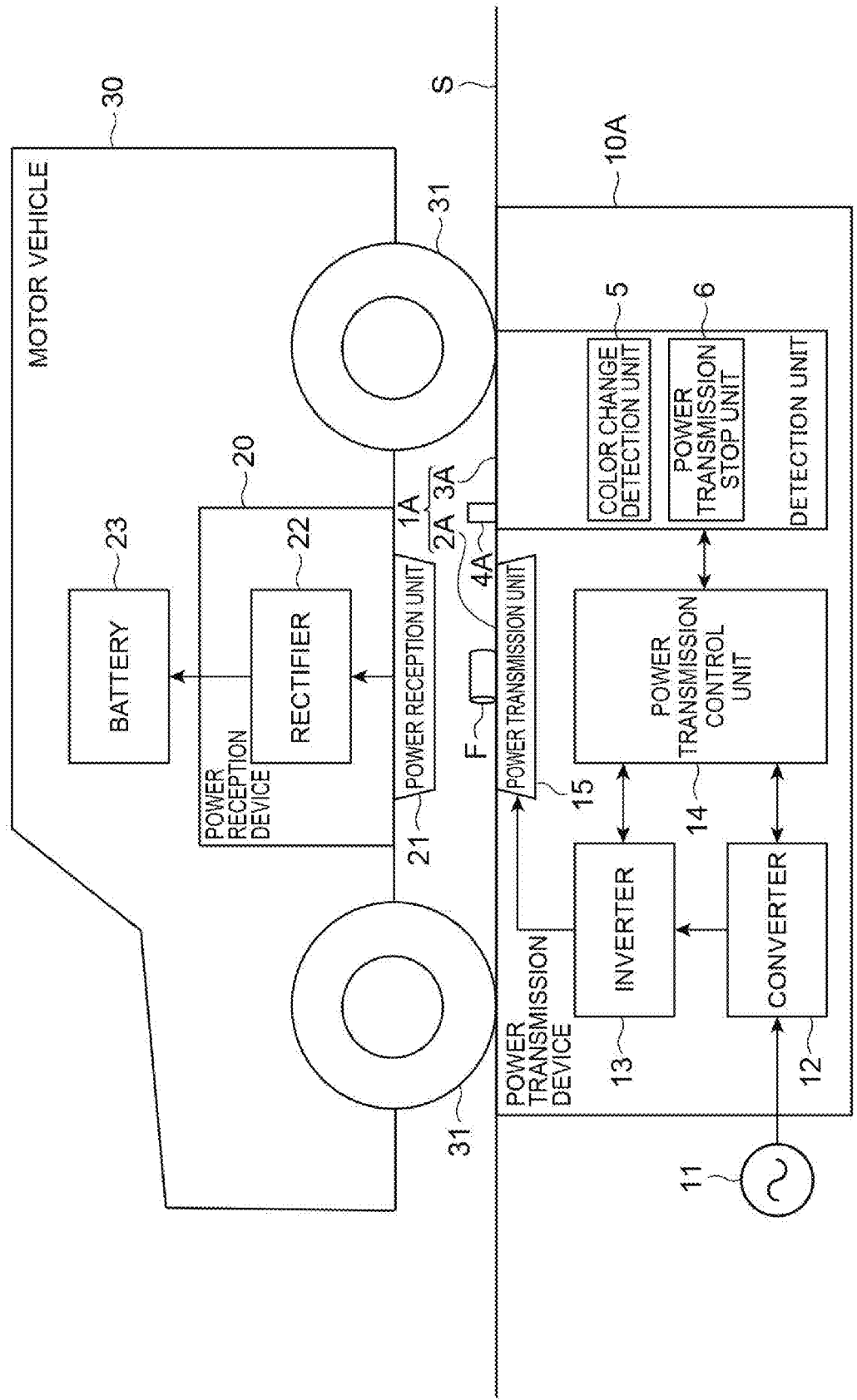
FIG. 1 is a block diagram showing a foreign object detection device and a power transmission device according to a first embodiment.

A foreign object detection device according to one aspect of the present disclosure is a foreign object detection device detecting, during wireless power transfer from a power transmission unit of a power transmission device to a power reception unit of a power reception device, a foreign object on the power transmission unit, the foreign object detection device comprising: a temperature sensitive body disposed at the power transmission unit and changing a color with temperature; and a detection unit detecting the foreign object by detecting a change in the color.

According to this foreign object detection device, provided is a foreign object detection device detecting, during wireless power transfer from a power transmission unit of a power transmission device to a power reception unit of a power reception device, a foreign object on the power transmission unit, and comprising: a temperature sensitive body that is disposed at the power transmission unit and changes a color with temperature; and a detection unit that detects the foreign object on the power transmission unit by detecting a change in the color of the temperature sensitive body. When the foreign object exists on the power transmission unit, the temperature around the foreign object rises and the color of the temperature sensitive body changes. The detection unit detects a change in the color of the temperature sensitive body, thereby detecting the foreign object on the power transmission unit. Thus, the foreign object on the power transmission unit can be detected with a simpler configuration.

In some modes, on the temperature sensitive body, a pattern including a plurality of the colors may appear when the temperature changes, and the detection unit may detect the foreign object by detecting appearance of the pattern.

With this configuration, a pattern containing a plurality of colors appears when the temperature changes on the temperature sensitive body, and the detection unit detects appearance of the pattern, thereby detecting the foreign object. Consequently, even if the color of the foreign object is the same as one of the colors included in the pattern on the temperature sensitive body, the foreign object that causes heat generation in the power transmission unit can be detected while preventing erroneous detection by detecting the other colors included in the pattern on the temperature sensitive body through the detection unit.

In some modes, the pattern may be a checkered pattern.

With this configuration in which the pattern is a checkered pattern, it is easier to detect the appearance of the pattern.

In some modes, the temperature sensitive body may be disposed on the power transmission unit installed on a road surface, and the detection unit may comprise: a camera installed on the road surface and receiving light reflected off the temperature sensitive body; a lens collecting the light; and a mirror directing the light collected by the lens toward the camera.

In this configuration, the temperature sensitive body is disposed on the power transmission unit installed on a road surface, and the detection unit comprises: a camera installed on the road surface and receiving light reflected off the temperature sensitive body; a lens collecting the light; and a mirror directing the light collected by the lens toward the camera. Hence, for example, when the power transmission unit installed on the road surface of such a parking lot performs wireless power transfer to the power reception unit installed on the undersurface of the motor vehicle, the camera can be mounted on the road surface so that it can barely be a constraint on the facility. Also, by the lens and the mirror, it is possible to detect a wide area of the temperature sensitive body from a narrow gap between the road surface and the undersurface of the motor vehicle.

The lens may be either a fisheye lens or a wide-angle lens.

In this configuration, the lens is a wide-angle lens or a fisheye lens, so that the height of the detection unit with respect to the detection area can be lowered.

A power transmission device according to another aspect of the present disclosure is a power transmission device comprising the foreign object detection device according to the one aspect of the present disclosure, and the power transmission unit.

Embodiments of the present disclosure will now be described with reference to the accompanying drawings.

As shown in FIG. 1, a power transmission device 10A according to the first embodiment of the present disclosure comprises a foreign object detection device 1A and a power transmission unit 15. The power transmission device 10A supplies power from the power transmission unit 15 installed on a road surface S to a power reception unit 21 in a power reception device 20 mounted on a motor vehicle 30 by wireless power transfer. The power transmission device 10A is installed in, for example, a parking lot. The motor vehicle 30 is, for example, an electric motor vehicle. The power transmission device 10A is configured to supply power to the power reception device 20 mounted on the motor vehicle 30 such as an electric motor vehicle arriving at such as a parking lot by using magnetic coupling between coils using such as magnetic resonance or electromagnetic induction. Note that the motor vehicle 30 may be various mobile objects, such as plug-in hybrid motor vehicles and underwater vehicles, instead of electric motor vehicles.

As shown in FIG. 1, the power transmission device 10A comprises a foreign object detection device 1A, a converter 12, an inverter 13, a power transmission control unit 14, and a power transmission unit 15. The power transmission device 10A is supplied with power from an external power source 11. The power source 11 supplies power required to generate the power to be transmitted to the motor vehicle 30, and supplies single-phase AC power like a commercial AC power source. Note that the power source 11 is not limited to a single-phase AC power source, and may be a power source that supplies three-phase AC power.

The converter 12 is an AC/DC converter that rectifies the AC power supplied from the power source 11 and converts it into DC power. The converter 12 may have a power factor correction [PFC] function and a buck-boost function. It is also possible to use a DC power source such as a fuel cell or a solar battery as the power source 11, and in that case, the converter 12 can be omitted. When the power source 11 is a DC power source, a DC/DC converter may be provided instead of the converter 12.

The inverter 13 converts the DC power from the converter 12 into AC power (high frequency power) having a frequency higher than that of the AC power of the power source 11 and supplies it to the power transmission unit 15. The power transmission control unit 14 is an electronic control unit including, for example, such as a central processing unit (CPU), a read only memory (ROM), and a random access memory (RAM). The power transmission control unit 14 controls power supply from the power transmission unit 15 of the power transmission device 10A to the power reception unit 21 of the power reception device 20. The power transmission control unit 14 controls the operations of the converter 12 and the inverter 13 to change the magnitude of the power transmitted from the power transmission unit 15 of the power transmission device 10A to the power reception unit 21 of the power reception device 20. As will be described later, upon reception of a command signal that stops power transmission from the foreign object detection device 1A that has detected foreign object, the power transmission control unit 14 stops power transmission from the power transmission unit 15 of the power transmission device 10A to the power reception unit 21 of the power reception device 20.

The power transmission unit 15 is a coil device installed on the road surface S of such as a parking lot. The power reception unit 21 of the power reception device 20 is a coil device installed on the undersurface of the motor vehicle 30. An electromagnetic coupling circuit is formed by bringing the power transmission unit 15 and the power reception unit 21 close to each other. This electromagnetic coupling circuit refers to a circuit in which a power transmission unit 15 and a power reception unit 21 are electromagnetically coupled to transmit power from the power transmission unit 15 to the power reception unit 21 by wireless power transfer. Note that the power transmission unit 15 and the power reception unit 21 may perform wireless power transfer by electromagnetic induction or may perform wireless power transfer by magnetic resonance. The power transmission unit 15 and the power reception unit 21 may be antenna devices.

The foreign object detection device 1A detects foreign object F on the power transmission unit 15 during wireless power transfer from the power transmission unit 15 of the power transmission device 10A to the power reception unit 21 of the power reception device 20. The foreign object F is a metal substance that causes heat generation between the power transmission unit 15 and the power reception unit 21. The foreign object F is, for example, such as an empty can.

The foreign object detection device 1A comprises a temperature sensitive body 2A and a detection unit 3A. The temperature sensitive body 2A is disposed at the power transmission unit 15, and its color changes with temperature. The temperature sensitive body 2A is disposed on the power transmission unit 15 installed on the road surface S. The temperature sensitive body 2A is, for example, a temperature sensitive paint applied to the top surface of the power transmission unit 15. The color of the temperature sensitive body 2A changes when the temperature of the power transmission unit 15 reaches a temperature of 40° C. to 80° C. at which power transmission to the power reception device 20 through the power transmission device 10A should be stopped. The temperature sensitive body 2A is composed of, for example, a heavy metal iodide whose color changes reversibly with temperature. The temperature sensitive body 2A is composed of, for example, $Hg_2[HgI_4]$, $Ag_2[HgI_4]$, and $Cu_2[HgI_4]$.

In this embodiment, the temperature sensitive body 2A has, for example, an achromatic color such as white or black at a temperature of less than 40° C., and changes color to any one of the chromatic colors of red, blue, and green when the temperature reaches 40° C. to 80° C. The temperature sensitive body 2A in this embodiment is a kind of temperature sensitive paint applied to the entire top surface of the power transmission unit 15. Note that the temperature sensitive body 2A may have a chromatic color at a temperature of less than 40° C., and may change color to an achromatic color when the temperature reaches 40° C. to 80° C. The temperature sensitive body 2A may have the color of visible light when the temperature reaches 40° C. to 80° C.

The detection unit 3A detects the foreign object F on the power transmission unit 15 by detecting a change in the color of the temperature sensitive body 2A. The detection unit 3A has a camera sensor unit 4A, a color change detection unit 5, and a power transmission stop unit 6. As shown in FIG. 2A, the camera sensor unit 4A of the detection unit 3A is installed on the road surface S and has a camera 41 that receives the light reflected off the temperature sensitive body 2A, a lens 42A that collects the light reflected off the temperature sensitive body 2A, and a mirror 43 that directs the light collected by the lens 42A toward the camera 41.

The camera 41 is disposed on the top surface of the power transmission unit 15 and receives the light reflected off the temperature sensitive body 2A. The camera 41 is, for example, a charge coupled device (CCD) camera. The camera 41 only needs to be able to detect visible light. The lens 42A is, for example, a wide-angle lens or a fisheye lens. The mirror 43 is disposed above the camera 41 and directs the light collected by the lens 42A toward the camera 41 disposed below the mirror 43.

In this embodiment, since the lens 42A is a wide-angle lens or a fisheye lens, the height h1 of the camera sensor unit 4A with respect to the detection area R1 can be lowered. The detection area R1 lies over the entire top surface of the power transmission unit 15. With the use of a wide-angle lens or a fisheye lens for the lens 42A, optical data can be acquired from a wide area. In the order arrangement in which the light collected by the lens 42A is reflected by the mirror 43 and then sent to the camera 41, a compact mirror 43 can be used and the device can be made compact. As shown in FIG. 2B, when the detection area R2 need not be wide and the height h2 of the camera sensor unit 4B need not be low because the top surface of the power transmission unit 15 is small, a standard lens may be used as the lens 42B.

The color change detection unit 5 shown in FIG. 1 detects a change in the color of the temperature sensitive body 2A by detecting the wavelength of the light received at the camera 41 of the camera sensor unit 4A. When the color change detection unit 5 detects a change in the color of the temperature sensitive body 2A, the power transmission stop unit 6 transmits a command signal for stopping the power transmission to the power transmission control unit 14, thereby the power transmission to the power reception device 20 through the power transmission device 10A is stopped.

Meanwhile, the power reception device 20 mounted on the motor vehicle 30 comprises a power reception unit 21 and a rectifier 22. The power reception device 20 is a device that receives power from the power transmission unit 15 of the power transmission device 10A and supplies power to a load such as a battery 23 of the motor vehicle 30. As described above, the power reception unit 21 is a coil device mounted between four wheels 31 on the undersurface of the motor vehicle 30. The magnetic flux generated in the power transmission unit 15 interlinks with the power reception unit 21, so that the power reception unit 21 generates induced current. Thus, the power reception unit 21 wirelessly receives the power from the power transmission unit 15. The rectifier 22 rectifies the AC power that the power reception unit 21 has received from the power transmission unit 15 and converts it into DC power. The DC power converted by the rectifier 22 is supplied to a load such as the battery 23 of the motor vehicle 30.

The operations of the foreign object detection device 1A and the power transmission device 10A of this embodiment will now be described. As shown in FIG. 3A, during power transmission from the power transmission unit 15 of the power transmission device 10A to the power reception unit 21 of the power reception device 20 mounted on the motor vehicle 30, the color of the temperature sensitive body 2A does not change if foreign object does not exist on the top surface of the power transmission unit 15. The color change detection unit 5 of the detection unit 3A does not detect a change in the color of the temperature sensitive body 2A. Since the power transmission stop unit 6 of the detection unit 3A does not transmit a command signal for stopping power transmission to the power transmission control unit 14, the power transmission control unit 14 of the power transmission device 10A continues power transmission. During power transmission from the power transmission unit 15 of the power transmission device 10A to the power reception unit 21 of the power reception device 20, the color of the temperature sensitive body 2A does not change even if foreign object, such as a fallen leaf, that cannot be a cause of heat generation between the power transmission unit 15 and the power reception unit 21 exists on the top surface of the power transmission unit 15, so that the power transmission control unit 14 of the power transmission device 10A continues power transmission.

Figure 3B:
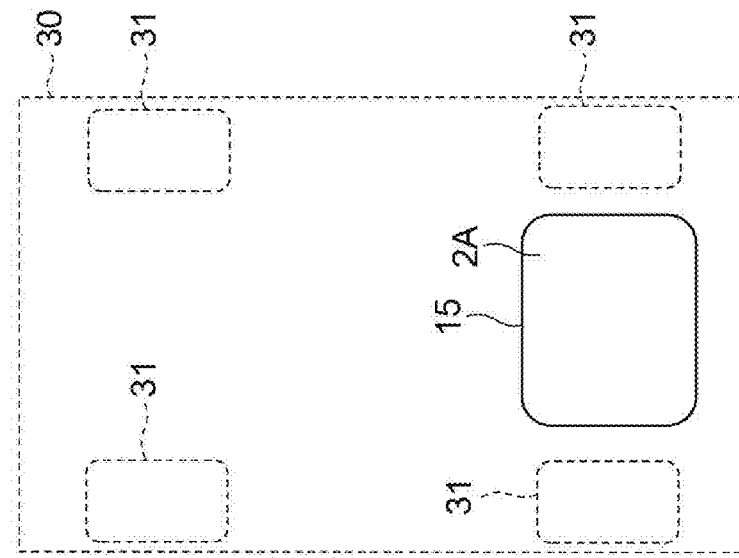
FIG. 3B is a plan view showing a state in which a foreign object that generates heat exists on the power transmission unit during power transmission by the power transmission device according to the first embodiment.
Figure 3A:
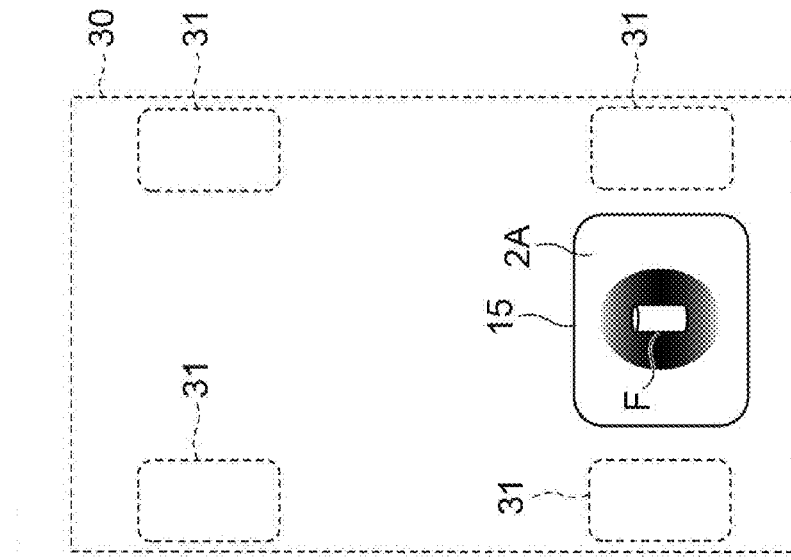
FIG. 3A is a plan view showing a state in which no foreign object exists on the power transmission unit during power transmission by the power transmission device according to the first embodiment.

As shown in FIG. 3B, during power transmission from the power transmission unit 15 of the power transmission device 10A to the power reception unit 21 of the power reception device 20, the color of the temperature sensitive body 2A changes if foreign object F, such as an empty can, that causes heat generation between the power transmission unit 15 and the power reception unit 21 exists on the top surface of the power transmission unit 15. The color change detection unit 5 of the detection unit 3A detects a change in the color of the temperature sensitive body 2A. The power transmission stop unit 6 of the detection unit 3A transmits a command signal for stopping power transmission to the power transmission control unit 14, and the power transmission control unit 14 of the power transmission device 10A stops power transmission.

According to this embodiment, the foreign object detection device 1A for detecting foreign object F on the power transmission unit 15 during wireless power transfer from the power transmission unit 15 of the power transmission device 10A to the power reception unit 21 of the power reception device 20, comprises the temperature sensitive body 2A that is disposed at the power transmission unit 15 and changes color with temperature, and the detection unit 3A that detects foreign object F on the power transmission unit 15 by detecting a change in the color of the temperature sensitive body 2A. When the foreign object F exists on the power transmission unit 15, the temperature around the foreign object F rises and the color of the temperature sensitive body 2A changes. The detection unit 3A detects a change in the color of the temperature sensitive body 2A, thereby the foreign object F on the power transmission unit 15 is detected. Thus, the foreign object F on the power transmission unit 15 can be detected with a simpler configuration.

Further, according to this embodiment, for example, unlike in a method that detects foreign object F by measuring the magnetic field between the power transmission unit 15 and the power reception unit 21, foreign object F is detected by detecting a change in the color of the temperature sensitive body 2A caused by heat generation. In other words, since the foreign object F is detected by directly detecting the heat generation, even if foreign object, such as a fallen leaf, that cannot be a cause of heat generation between the power transmission unit 15 and the power reception unit 21 exists on the top surface of the power transmission unit 15, the foreign object F is not detected as a cause of heat generation. Hence, preventing erroneous detection prevents unnecessary interruption of power transmission by the power transmission device 10A. Further, according to this embodiment, for example, unlike in a method that detects foreign object F by measuring the magnetic field between the power transmission unit 15 and the power reception unit 21, foreign object F is detected by directly detecting heat generation, which allows smaller foreign object F to be detected. Small foreign object F can be detected by adopting a camera 41 having sufficiently small pixels, that is, a camera 41 having a large number of pixels and high resolution so that the image of the foreign object F is projected onto one or more pixels of the imaging device when an image of foreign object F is formed on the imaging surface of the camera 41 through the optical system (a combination of the lens 42A and the mirror 43 or a combination of the lens 42B and the mirror 43).

Further, according to this embodiment, the temperature sensitive body 2A is disposed on the power transmission unit 15 installed on the road surface S, and the detection unit 3A is installed on the road surface S and comprises a camera 41 that receives the light reflected off the temperature sensitive body 2A, a lens 42A that collects light, and a mirror 43 that directs the light collected by the lens 42A toward the camera 41. For this reason, for example, when the power transmission unit 15 installed on the road surface S of such as a parking lot performs wireless power transfer to the power reception unit 21 installed on the undersurface of the motor vehicle 30, the camera 41 can be mounted on the road surface S so that it can barely be a constraint on the facility. By the lens 42A and the mirror 43, it is possible to detect a wide area of the temperature sensitive body 2A from a narrow gap between the road surface S and the undersurface of the motor vehicle 30.

Figure 4:
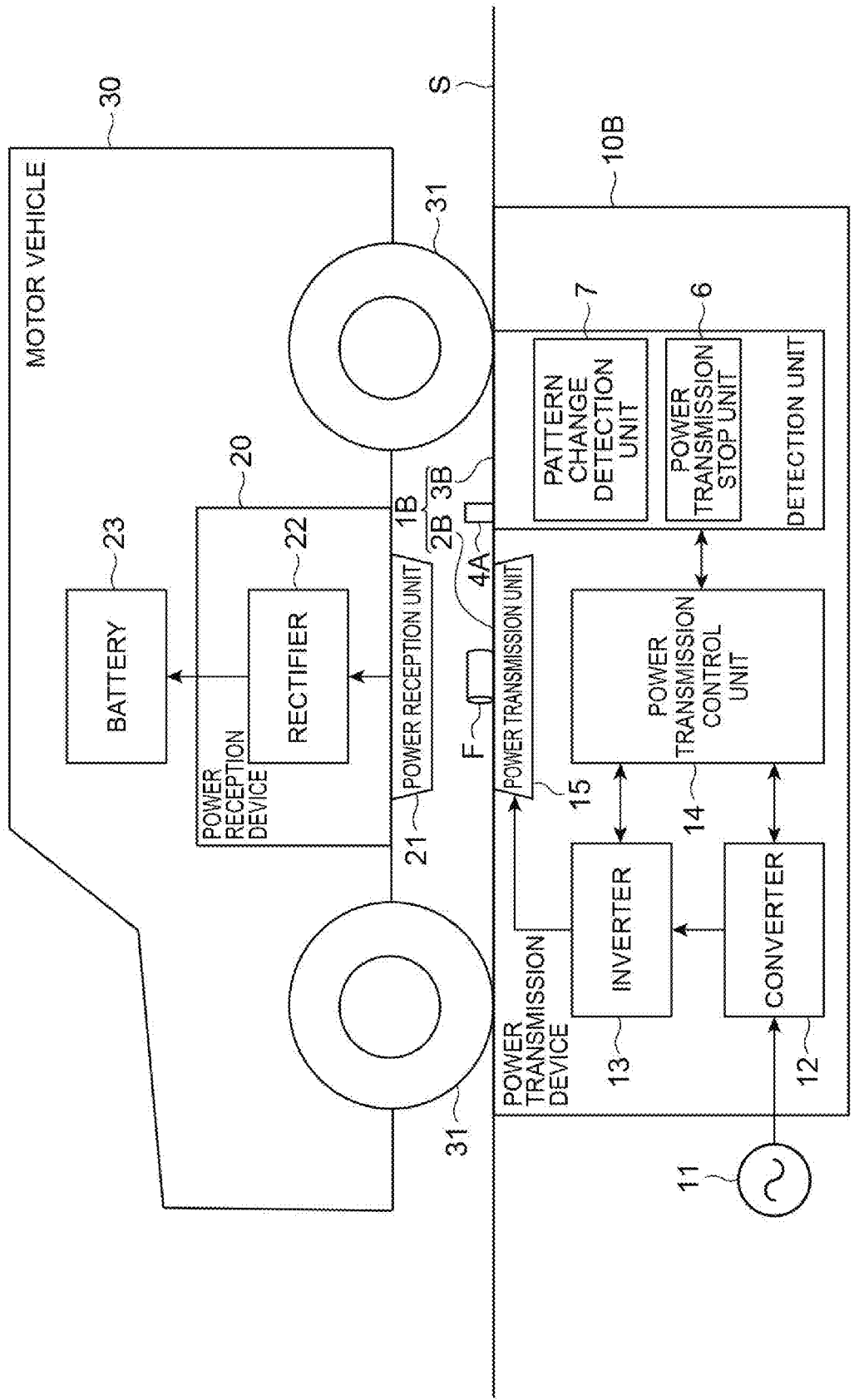
FIG. 4 is a block diagram showing a foreign object detection device and a power transmission device according to a second embodiment.

The second embodiment of the present disclosure will now be described. As shown in FIG. 4, the foreign object detection device 1B and the power transmission device 10B of this embodiment comprise a temperature sensitive body 2B. The temperature sensitive body 2B is, for example, a temperature sensitive paint applied to the top surface of the power transmission unit 15. On the temperature sensitive body 2B, a pattern including a plurality of colors appears when the temperature changes. A pattern containing a plurality of colors refers to, for example, the phenomenon in which a single achromatic color such as white or black appears at a temperature of less than 40° C., but a checkered pattern including any two or more chromatic colors of, for example, red, blue, and green appears when the temperature reaches 40° C. to 80° C.

Note that the temperature sensitive body 2B may have a single chromatic color at a temperature of less than 40° C., and a checkered pattern including two or more achromatic colors of, for example, white, black, and gray when the temperature reaches 40° C. to 80° C. The pattern is not limited to a checkered pattern, and may be a combination of other figures, patterns, and colors. Also, on the temperature sensitive body 2B, some pattern including a plurality of colors may appear at a temperature of less than 40° C., and some pattern including a plurality of colors may appear when the temperature reaches 40° C. to 80° C. The pattern including a plurality of colors that appears when the temperature of the temperature sensitive body 2B reaches 40° C. to 80° C. may be a pattern including the color of visible light.

The pattern change detection unit 7 of the detection unit 3B detects the foreign object F on the power transmission unit 15 by detecting the pattern that appears on the temperature sensitive body 2B. The pattern change detection unit 7 checks an image of the temperature sensitive body 2B received by the camera 41 of the camera sensor unit 4A against the pattern including a plurality of colors that appears when the temperature of the temperature sensitive body 2B reaches 40° C. to 80° C. and is stored in a storage device (not shown in the drawing) of the foreign object detection device 1B. When the image of the temperature sensitive body 2B and the stored pattern match, the pattern change detection unit 7 detects the presence of the foreign object F on the power transmission unit 15. When the pattern change detection unit 7 detects a pattern including a plurality of colors on the temperature sensitive body 2B, the power transmission stop unit 6 transmits a command signal for stopping the power transmission to the power transmission control unit 14, thereby the power transmission to the power reception device 20 through the power transmission device 10B is stopped.

The operations of the foreign object detection device 1B and the power transmission device 10B of this embodiment will now be described. As shown in FIG. 5A, during power transmission from the power transmission unit 15 of the power transmission device 10B to the power reception unit 21 of the power reception device 20, a pattern 2p including a plurality of colors appears on the temperature sensitive body 2B if foreign object F, such as an empty can, that causes heat generation between the power transmission unit 15 and the power reception unit 21 exists on the top surface of the power transmission unit 15. The pattern change detection unit 7 of the detection unit 3B detects the pattern 2p appearing on the temperature sensitive body 2B. The power transmission stop unit 6 of the detection unit 3B transmits a command signal for stopping power transmission to the power transmission control unit 14, and the power transmission control unit 14 of the power transmission device 10B stops power transmission.

Figure 5B:
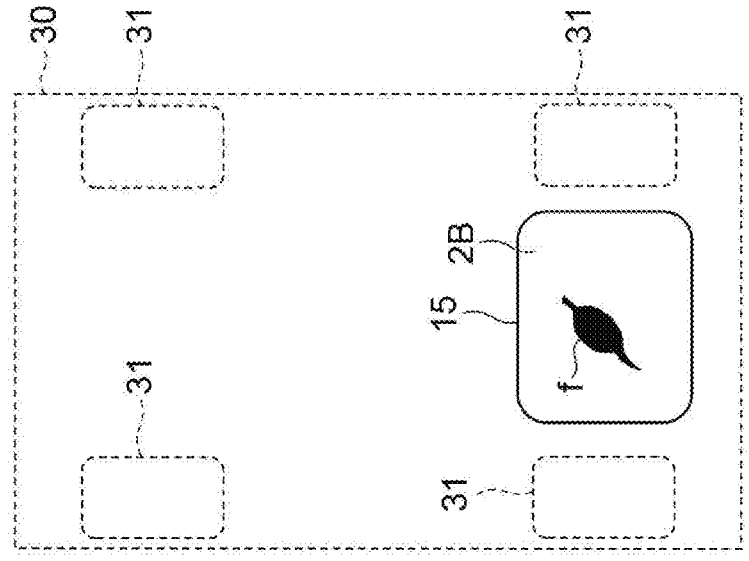
FIG. 5B is a plan view showing a state in which foreign object that does not generate heat exists on the power transmission unit during power transmission by the power transmission device according to the second embodiment.
Figure 5A:
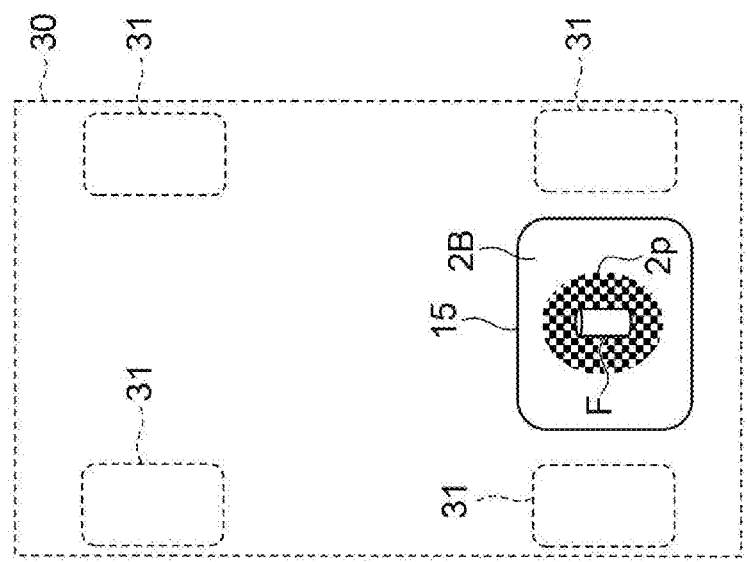
FIG. 5A is a plan view showing a state in which foreign object that generates heat exists on the power transmission unit during power transmission by the power transmission device according to a second embodiment.

A description will now be given of the case where as shown in FIG. 5B, during power transmission from the power transmission unit 15 of the power transmission device 10B to the power reception unit 21 of the power reception device 20, foreign object f, such as a fallen leaf, that cannot be a cause of heat generation between the power transmission unit 15 and the power reception unit 21 exists on the top surface of the power transmission unit 15. Even when the color of the foreign object f is the same as one of the colors included in the pattern 2p on the temperature sensitive body 2B, the pattern 2p on the temperature sensitive body 2B does not appear. Consequently, the pattern change detection unit 7 of the detection unit 3B does not detect the pattern 2p appearing on the temperature sensitive body 2B. The power transmission control unit 14 of the power transmission device 10A continues power transmission.

According to this embodiment, a pattern 2p containing a plurality of colors appears when the temperature changes on the temperature sensitive body 2B, and the detection unit 3B detects the pattern 2p that appears on the temperature sensitive body 2B, thereby the foreign object F on the power transmission unit 15 is detected. Consequently, even if the colors of the foreign objects F and f are the same as one of the colors included in the pattern 2p on the temperature sensitive body 2B, the foreign object F that causes heat generation in the power transmission unit 15 can be detected while preventing erroneous detection by detecting the other colors included in the pattern 2p on the temperature sensitive body 2B through the detection unit 3B. Preventing erroneous detection prevents unnecessary interruption of power transmission by the power transmission device 10B.

Although the embodiments and modifications of the present disclosure have been described so far, the present disclosure is not limited to the above-described embodiments. For instance, the temperature sensitive bodies 2A and 2B may be a sheet-like member or a plate member that is disposed or attached on the top surface of the power transmission unit 15 and changes color with temperature. Also, when the foreign object detection devices 1A and 1B detect the foreign object F, the presence of the foreign object F may be notified through such as an alarm sound, signal light without stopping the power transmission devices 10A and 10B. Moreover, the foreign object detection devices 1A and 1B are not necessarily built in the power transmission devices 10A and 10B, and may be disposed in the existing power transmission devices 10A and 10B, respectively. Further, an arrangement of the cameras 41 of the camera sensor units 4A and 4B may be located in any position in which the surfaces of the power transmission unit 15 and the power reception unit 21 can be photographed.

INDUSTRIAL APPLICABILITY

In the foreign object detection device and the power transmission device of the present disclosure, a foreign object on the power transmission unit can be detected with a simpler configuration.

REFERENCE SIGNS LIST 1A, 1B Foreign object detection device
2A, 2B Temperature sensitive body
2p Pattern
3A, 3B Detection unit
4A, 4B Camera sensor unit
5 Color change detection unit
6 Power transmission stop unit
7 Pattern change detection unit
10A, 10B Power transmission device
11 Power source
12 Converter
13 Inverter
14 Power transmission control unit
15 Power transmission unit
20 Power reception device
21 Power reception unit
22 Rectifier
23 Battery
30 Motor vehicle
31 Wheel
41 Camera
42A, 42B Lens
43 Mirror
S Road surface
h1, h2 Height
R1, R2 Detection area
F, f Foreign object

The invention claimed is:

1. A foreign object detection device detecting, during wireless power transfer from a power transmission unit of a power transmission device to a power reception unit of a power reception device, a foreign object on the power transmission unit, the foreign object detection device comprising:
a temperature sensitive body disposed at the power transmission unit and changing a color with temperature; and
a detection unit detecting the foreign object by detecting a change in the color.

2. The foreign object detection device according to claim 1, wherein
on the temperature sensitive body, a pattern including a plurality of the colors appears when temperature changes, and
the detection unit detects the foreign object by detecting appearance of the pattern.

3. The foreign object detection device according to claim 2, wherein the pattern is a checkered pattern.

4. The foreign object detection device according to claim 1, wherein
the temperature sensitive body is disposed on the power transmission unit installed on a road surface, and
the detection unit comprises:
a camera installed on the road surface and receiving light reflected off the temperature sensitive body;
a lens collecting the light; and
a mirror directing the light collected by the lens toward the camera.

5. The foreign object detection device according to claim 4, wherein the lens is either a fisheye lens or wide-angle lens.

6. A power transmission device comprising the foreign object detection device according to claim 1, and the power transmission unit.

* * * * *